United States Patent
Boulanger et al.

(10) Patent No.: US 7,957,372 B2
(45) Date of Patent: ***Jun. 7, 2011

(54) AUTOMATICALLY DETECTING DISTRIBUTED PORT SCANS IN COMPUTER NETWORKS

(75) Inventors: Alan David Boulanger, Amherst, MA (US); Robert William Danford, Boulder, CO (US); Kevin David Himberger, Raleigh, NC (US); Clark Debs Jeffries, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1554 days.

This patent is subject to a terminal disclaimer.

(21) Appl. No.: 10/896,733

(22) Filed: Jul. 22, 2004

(65) Prior Publication Data

US 2006/0018262 A1 Jan. 26, 2006

(51) Int. Cl.
*H04L 12/28* (2006.01)
*G06F 9/00* (2006.01)
*G06F 11/00* (2006.01)

(52) U.S. Cl. ............................. 370/389; 726/13; 726/23

(58) Field of Classification Search ................ 726/1, 13, 726/22–30; 370/216, 241–242, 389–394, 370/474
See application file for complete search history.

(56) References Cited

U.S. PATENT DOCUMENTS

| | | | |
|---|---|---|---|
| 5,414,833 A | 5/1995 | Hershey et al. | 395/575 |
| 5,652,796 A | 7/1997 | Barraza et al. | 380/29 |
| 5,983,348 A | 11/1999 | Ji | 713/200 |
| 5,991,881 A | 11/1999 | Conklin et al. | 713/201 |
| 6,167,516 A | 12/2000 | Camion et al. | 713/168 |
| 6,275,942 B1 | 8/2001 | Bernhard et al. | 713/201 |
| 6,279,113 B1 | 8/2001 | Vaidya | 713/201 |
| 6,282,546 B1 | 8/2001 | Gleichauf et al. | 707/102 |
| 6,330,610 B1 | 12/2001 | Docter et al. | 709/229 |
| 6,338,141 B1 | 1/2002 | Wells | 713/200 |
| 6,363,489 B1 | 3/2002 | Comay et al. | 713/201 |
| 6,405,318 B1 | 6/2002 | Rowland | 713/200 |

(Continued)

FOREIGN PATENT DOCUMENTS

EP 1 081 894 A1 3/2001

(Continued)

OTHER PUBLICATIONS

K. Daley et al., "A Structural Framework for Modeling Multi-Stage Network Attacks", IEEE Proceedings of the International Conference on Parallel Processing Workshops, '02, 4 pages.

(Continued)

*Primary Examiner* — Kwang B. Yao
*Assistant Examiner* — Tung Q Tran
(74) *Attorney, Agent, or Firm* — Dillon & Yudell LLP

(57) ABSTRACT

A detection and response system including a set of algorithms for detecting within a stream of normal computer traffic a subset of (should focus on network traffic eliciting a response) TCP or UDP packets with one IP Source Address (SA) value, one or a few Destination Address (DA) values, and a number exceeding a threshold of distinct Destination Port (DP) values. A lookup mechanism such as a Direct Table and Patricia search tree record and trace sets of packets with one SA and one DA as well as the set of DP values observed for the given SA, DA combination. The detection and response system reports the existence of such a subset and the header values including SA, DA, and multiple DPs of the subset. The detection and response system also includes various administrative responses to reports.

34 Claims, 12 Drawing Sheets

U.S. PATENT DOCUMENTS

| | | | |
|---|---|---|---|
| 6,477,651 B1 | 11/2002 | Teal ............................... | 713/200 |
| 6,487,204 B1 | 11/2002 | Dacier et al. .................... | 370/395 |
| 6,487,666 B1* | 11/2002 | Shanklin et al. ................ | 726/23 |
| 2002/0133586 A1* | 9/2002 | Shanklin et al. ............... | 709/224 |
| 2003/0101353 A1* | 5/2003 | Tarquini et al. ............... | 713/200 |
| 2003/0110274 A1* | 6/2003 | Pazi et al. ..................... | 709/229 |
| 2003/0200441 A1 | 10/2003 | Jeffries et al. | |
| 2004/0128550 A1 | 7/2004 | Govindarajan et al. | |
| 2004/0210588 A1* | 10/2004 | Simkins et al. ............... | 707/100 |
| 2005/0007958 A1* | 1/2005 | Auerbach ...................... | 370/241 |
| 2005/0018618 A1* | 1/2005 | Mualem et al. ................ | 370/252 |
| 2005/0027854 A1* | 2/2005 | Boulanger et al. ............. | 709/224 |
| 2006/0253903 A1* | 11/2006 | Krumel .......................... | 726/13 |
| 2010/0146612 A1* | 6/2010 | Toomey .......................... | 726/9 |

FOREIGN PATENT DOCUMENTS

| | | |
|---|---|---|
| JP | 2002-124996 | 4/2002 |
| WO | 02/48959 A2 | 6/2002 |
| WO | WO 2005/015871 | 2/2005 |

OTHER PUBLICATIONS

P. Liu, et al., "Multi-Phase Damage Confinement in Database Systems for Intrusion Tolerance", Proceedings 14$^{th}$ IEEE Computer Security Foundations Workshop, p. 191-205, Jun. 2001.

Cho, K., et al., An Aggregation Technique for Traffic Monitoring, Proceedings of the 2002 Symposium on Applications and the Internet (SAINT'02w), IEEE, pp. 74-81 (2002).

Kaizaki, R., et al., Detection of Denial of Service attacks using AGURI, Proceeding of the International Conference on Telecommunications, vol. 1, pp. 808-812 (2002).

International Search Report for International Application No. PCT/EP2005/053518 dated Oct. 28, 2005.

Partial Translation office action, Japanese Patent Application No. 2007-521949, Mailing date of office action : Sep. 7, 2010.

* cited by examiner

300

500

AUTOMATICALLY DETECTING DISTRIBUTED PORT SCANS IN COMPUTER NETWORKS

CROSS REFERENCE TO RELATED APPLICATION

The present application relates to application Ser. No. 10/629,175, filed Jul. 29, 2003, assigned to the assignee of the present invention and incorporated herein in its entirety.

The present invention relates to application Ser. No. 10/896,680 assigned to the assignee of the present invention and filed concurrently herewith.

BACKGROUND OF THE INVENTION

1. Field of the Invention

The present invention relates to computer networks in general and in particular to detecting and managing malicious traffic in said computer networks.

2. Prior Art

The worldwide web (WWW), better known as the Internet, is fast becoming the premier computer network for communicating both private and public information. The Internet is an open network that can be accessed by anyone using primarily a protocol called TCP/IP (Transmission Control Protocol/Internet Protocol) or other protocols. Because of its openness computers on private networks (intranets) are susceptible to malicious attacks by hackers. Computers have become the main instrument of communication for business and government agencies. For example, many business and government agencies use computers and computer networks to link remote offices, share data and other resources among employees within an office or campus, communicate with customers via electronic mail, reach new customers via electronic mail, provide information via web sites, etc.

Because businesses, governments and individuals rely heavily on computers and the Internet malicious attacks could result in catastrophic economic loss or embarrassment. As a consequence computer security has become a major concern of business, government and individuals using the computer as a major communication vehicle.

There are several ways in which hackers may elect to inflict malicious attacks on computers. One way is to disrupt computers' operation by disseminating programs that take unauthorized control of a computer's operating system. Another way is to discover confidential information about assets in the computer or a subnet in the network for the purpose of deleting data, modifying date and/or copying data. Any of these actions could adversely affect a home, business, or governmental agency network.

There are several techniques used by hackers or attackers to gather information on network devices. Port scanning is one of the techniques used by hackers or attackers to gather information relative to one host or several hosts. When several hosts are involved the technique is referred to as Distributed Port Scanning. With port scanning, the hacker uses legitimate TCP/IP (Transmission Control Protocol/Internet Protocol) commands to gather information. In this regard the hacker issues a SYN (Synchronize) packet masquerading as a station wishing to initiate a TCP session. Alternatively, the hacker may issue an RST packet. In either case the hackers hope a non-suspecting host responds with packets from which information about the host can be gleaned. There are many other combinations that can be used for port scanning. Such combination includes SYN/ACK, FIN, Null Christmas tree packets, etc. In fact, any protocol requiring a response may be used for port scanning.

The prior art has recognized the importance of computer networks and has provided intrusion detection systems to protect them from hackers. Examples of prior art detection systems can be found in U.S. Pat. Nos. 6,405,318; 6,363,489; 6,477,651; 6,279,113; 6,282,546; 5,991,881; 6,338,141; 5,414,833; and 5,983,348. Even though the Intrusion Detection System (IDS) described in each of the patents works well for its intended purpose it does not work well in detecting scanning activities.

It is believed the inability of prior art IDS to detect scanning of the network is based on the fact that they use a library of known patterns of header values or payload bytes. Packet headers or payloads in received packets are compared to known patterns which can be regular expressions or fixed values. The drawback with this approach is that such libraries cannot fully include reconnaissance or scan patterns not seen before. As a consequence some prior art IDS cannot protect against novel reconnaissance traffic.

Even the IDS technologies that boast the ability to detect scanning only mean that they can discover if many packets (some threshold) have been sent to a single destination address. They are unable to correlate scans using fewer packets (than the threshold) and further hampered when multiple destinations and formats are used.

In view of the above, prior art techniques and apparatus do not provide the network administrator with sufficient power to defend a computer network against reconnaissance or scan traffic. As a consequence a system and method, such as those described herein, are required to provide the additional protection.

SUMMARY OF THE INVENTION

It is believed unauthorized entries to network devices, such as hosts (computers), are done in two stages, namely reconnaissance and attack. During the reconnaissance stage information about computers is gathered. The gathered information is used to disrupt computing activities during the attack stage.

The present invention detects unauthorized scanning (also called reconnaissance) during the reconnaissance stage and takes corrective action set forth herein.

The system includes a programmed general processor, such as the PowerPC, or specialized processors, such as the PowerNP coacting with a lookup and recording structure to detect within high bandwidth traffic TCP/IP SYN (Synchronize) or RST (Reset) packets characterized by one Source Address (SA), one or a few Destination Addresses (DAs) and a few (less than 4) or many (greater than 4) Destination Ports (DP). TCP/IP packets meeting these characteristics are flagged and reported to administrative management for further action.

In one embodiment the lookup and recording structure includes a Direct Table (DT) and associated Patricia trees. There are two tiers of Full Match (FM) lookup. The first tier uses a hash of the SA and DA, in the portion of a received packet known as the key or header, to index into a slot of a first Direct Table. Selected bits from the DA and SA are used to walk the tree associated with the slot until a leaf is reached. The SA and DA in the leaf are compared with SA and DA in the key and if match the DP in the key is compared with a link list of DPs for the same SA and DA. If the DP is new (i.e. No match found) it is added to the list. When the number of DPs, in the list, $\geq n$, the hash of the SA is used to do a second tier lookup in a second Direct Table and associated Patricia tree.

The lookup in the second table is similar to the lookup in the first table. If the SA in the leaf of the second table matches the unhash SA the DAs and DPs in the leaf are examined and if DAs≧n and the DPs≧(equal or greater than) n an alarm is sounded declaring the packet with the SA and DA as an unauthorized scanning or reconnaissance packet. In response to the alarm the network administrator takes action to limit action of the SA from which the packets are launched. In one embodiment of the invention n is set to 4.

In an alternative embodiment, one could use a ratio of destination addresses to ports searched to determine whether this traffic is malicious or not. This traffic ratio is actually a multiplier that is the number of unique DAs multiplied by the number of unique DPs and ensuring the product is greater than 10 (or another number decided upon). This would allow smaller scans to be discovered, but that are initially crafted to evade even low threshold detectors. This is a technique often employed by attackers, sending recon packets very slowly, as to evade detection.

In the previously described alternative embodiment the static number (like 4) would not be used, but rather the multiplier, compared to a static number (like 10). Input to the hash would then consist of the SA only. In each leaf, a list of DAs associated with the SA would be kept. Each DA in the list would be associated with a list of DPs. This larger leaf would allow detection of slow scans to many DA and DP combinations from one or a few SAs. The detection of these scans would be much the same, except instead of comparing the static number (like 4), a count of unique DPs per a DA would be obtained and then multiplied by other DAs (associated with the one SA). The response to such scans with multiple DAs and DPs for a particular SA would continue in the manner described above.

DETAILED DESCRIPTION OF INVENTION

Computer network administration includes defending network assets from malicious reconnaissance traffic. The reconnaissance traffic in some cases entails a set of packets with one Source Address (SA) corresponding to the attacker, one or a few Destination Addresses (DA) values corresponding to a victim machine or machines to be studied by the attacker, and a few or many Destination Ports (DPs) corresponding to applications that are thought to be possibly vulnerable by the attacker.

The administrator may rely upon tools, such as the one disclosed in the present invention, to assist in defending the network. As part of network defense, an administrator may wish to detect such sets of packets as they pass through a switch, router, Network Interface Card (NIC), appliance, or, more generally, a machine capable of classifying, switching routing, policing functions, or other security functions based upon classification results.

Figure 1:
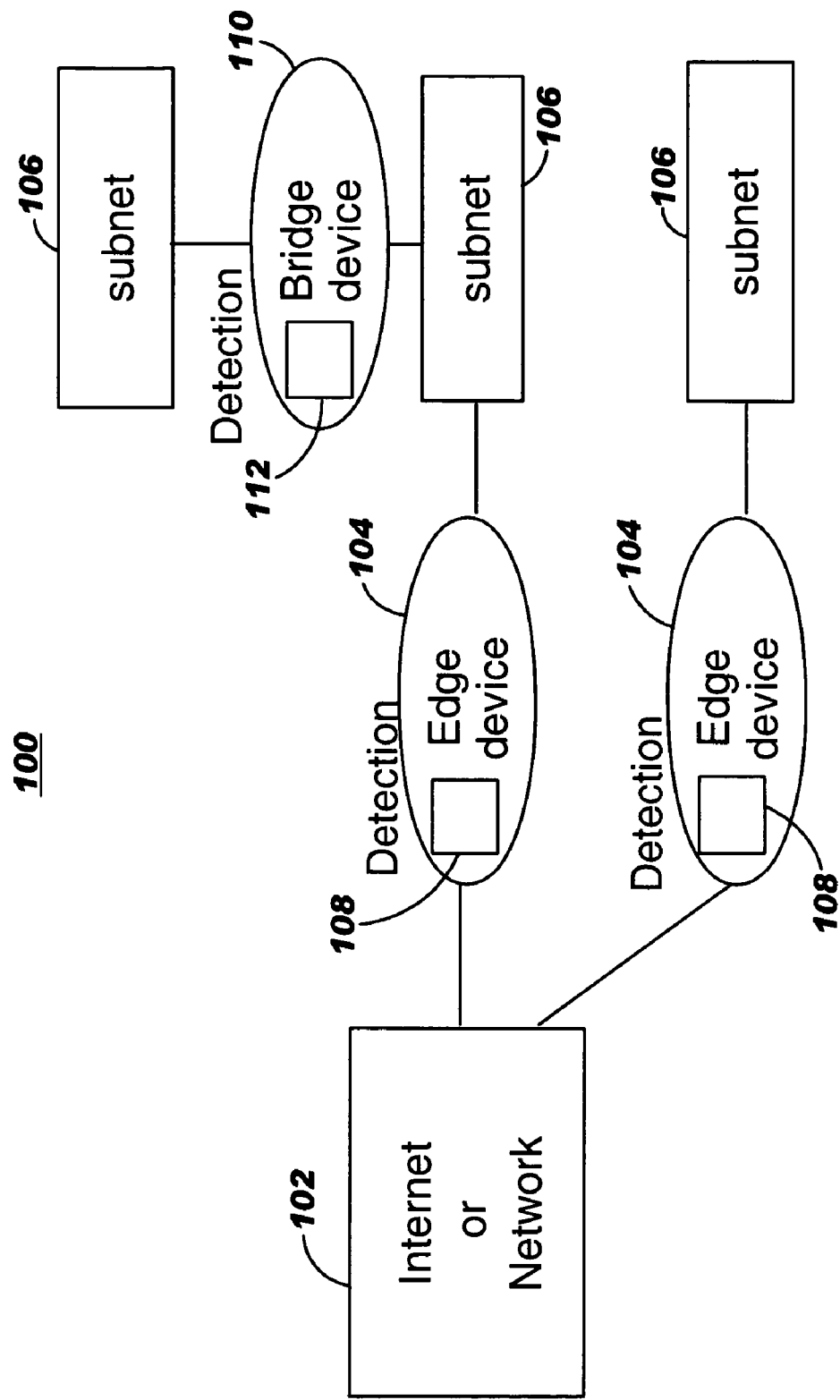
FIG. 1 shows high level components of a network and in particular some potential logical locations of the present invention as detection mechanism.

FIG. 1 shows a highly simplified network 100 in which the present invention can be deployed. The Internet or other network 102 connects to Edge devices 104. Each edge device might or might not be provided with detection assembly 108 containing an instance of the invention. Edge devices also connect subnets 106. In turn, two subnets might be connected by a Bridge device 110. A Bridge device might or might not contain an instance of the present invention 112. The edge devices may include routers, switches, servers, etc. Because Edge devices and Bridge devices are well known in the prior art, only those portions that include the teachings of the present invention or are necessary to understand the present invention will be discussed herein.

Figure 2:
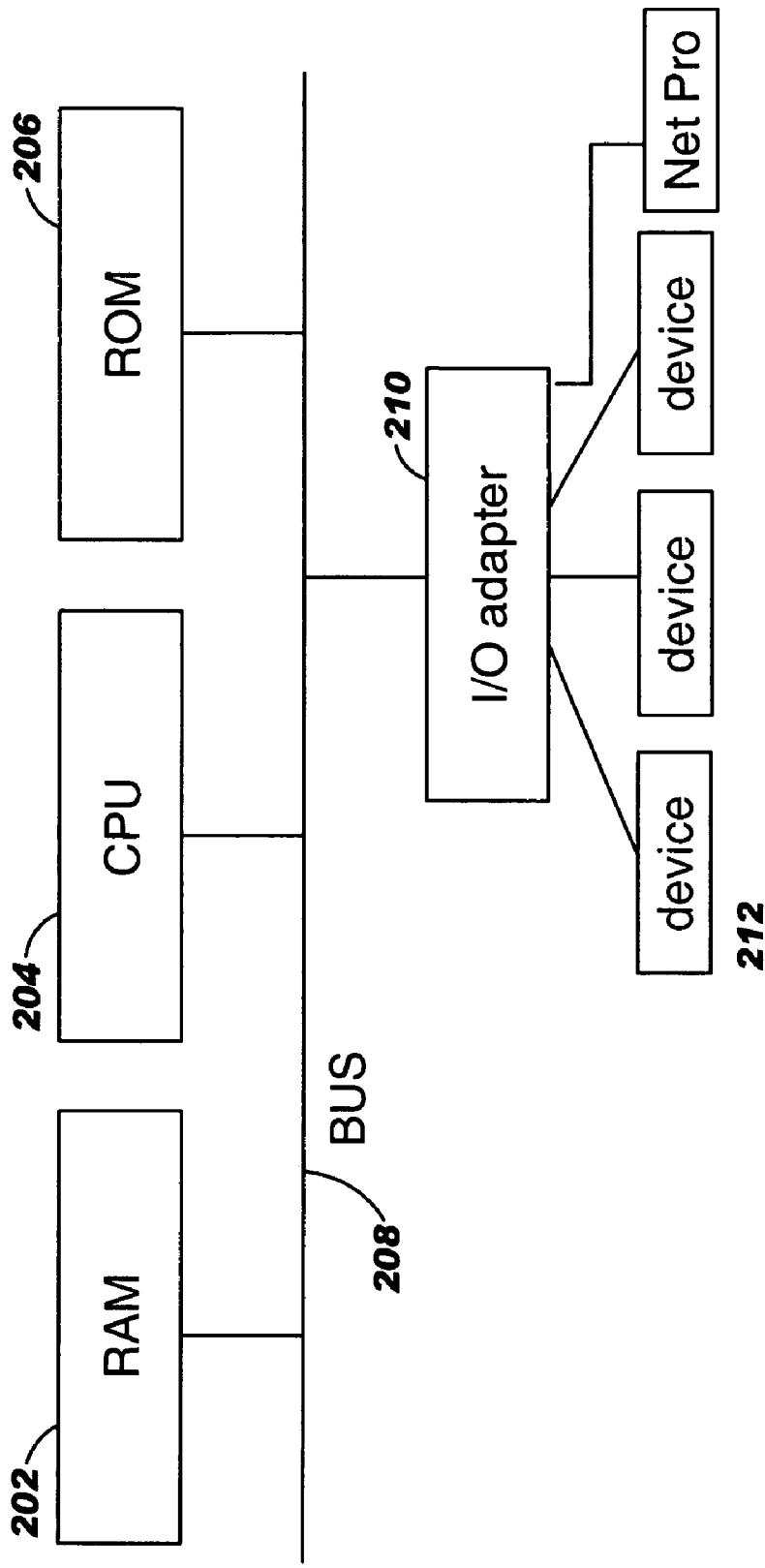
FIG. 2 shows high level components of hardware and in particular some potential logical locations of the components needed to enable the present invention.

FIG. 2 shows block diagram 200 of components within detection assembly 108 of Edge devices or Bridge device. Random Access Memory (RAM) 202 stores updates of information as included in the present invention. A Central Processing Unit (CPU) 204 has access to data stored at configuration in Read Only Memory (ROM) 206 to implement the algorithms of the present invention and thereby update RAM. A Bus 208 is provided for communication of signals among the components. An Input/Output (I/O) adapter 210 manages signaling to and from external devices 212 that might include a general purpose computer with monitor (not shown) observed periodically by a human administrator.

Figure 9:
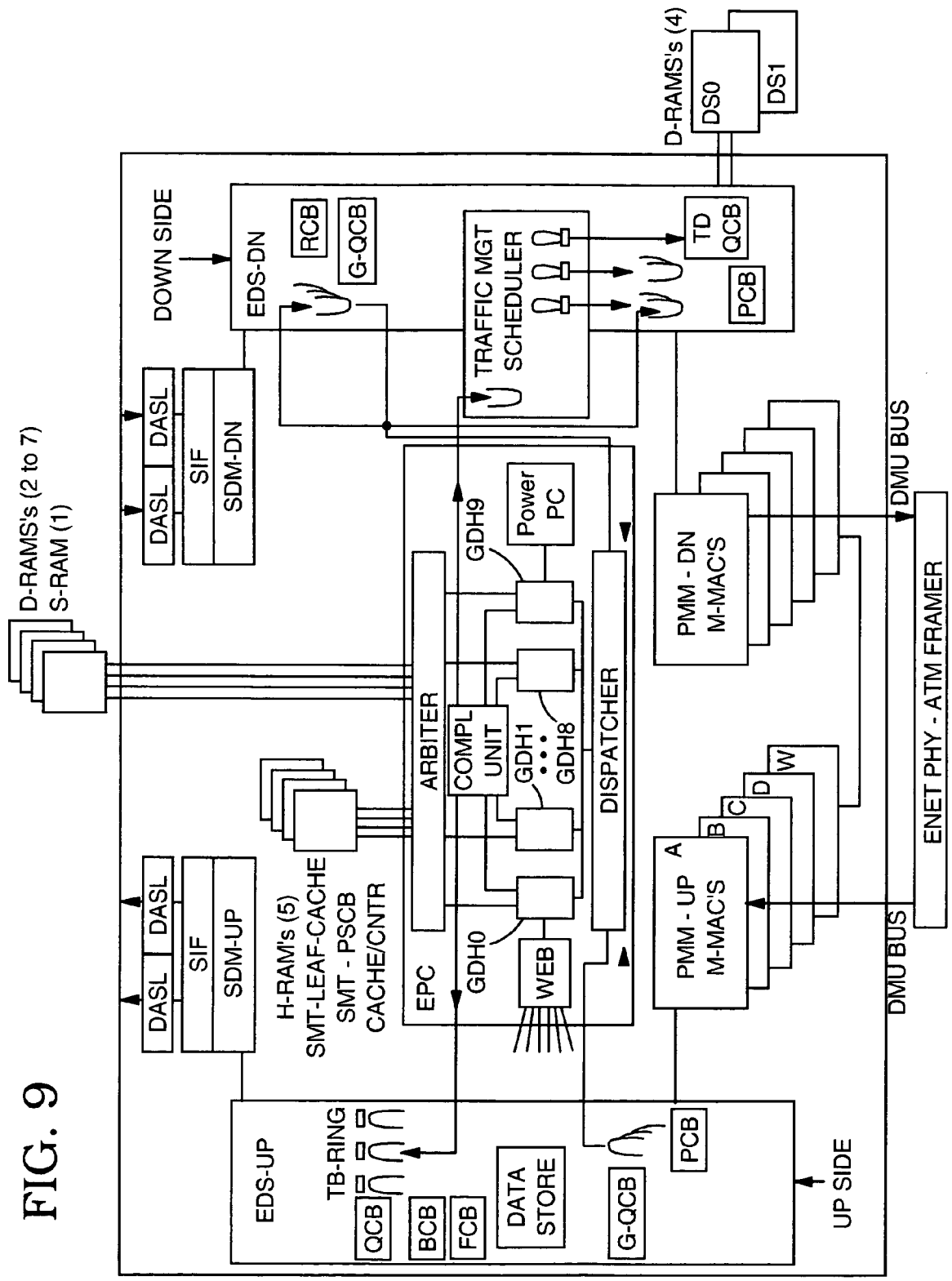
FIG. 9 shows a block diagram of a Network Processor in which the present invention can be implemented.

In an alternate embodiment Network Processor (NET PRO), such as the PowerNP developed and marketed by IBM, is coupled to the I/O adapter 210. The Network Processor is placed within the data plane and contains all the necessary components and algorithms for routing packets within the network. The reconnaissance algorithms according to the teachings of the present invention are executed on the Network Processor. Turning to FIG. 9 for the moment a block diagram of the Network Processor is shown. FIG. 9 is the same as FIG. 18 of U.S. Pat. No. 6,404,752 which describes the Network Processor and is incorporated in its entirety herein. Because of this incorporation detailed description of the Network Processor can be readily obtained. Therefore, only those features of the Network Processor that are directly related to and used by the present invention will be identified and discussed. The Embedded Processor Complex (EPC) contains a plurality of processors that execute algorithms to route data and detection algorithms according to the teachings of the present invention. As stated herein the detection algorithm detects and identifies reconnaissance packets on the network. Another feature of interest is the data structures shown in the incorporated patent. The data structure includes a Direct Table and Patricia Trees coupled thereto. The data structure and associated tree search engine is used as the lookup and tracking mechanism of the present invention.

Figure 3:
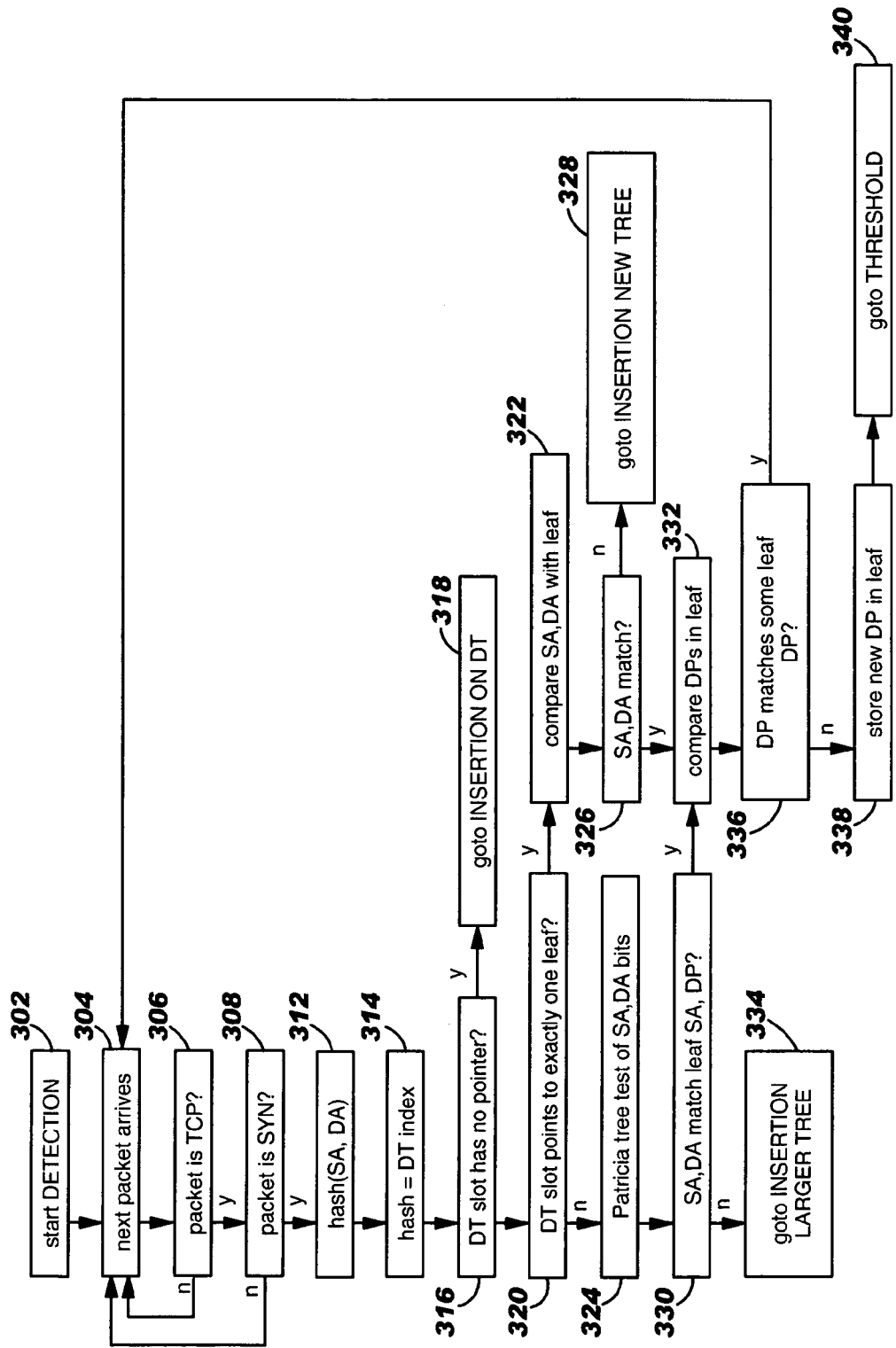
FIG. 3 shows a flowchart for the detection portion of the present invention.
Figure 4:
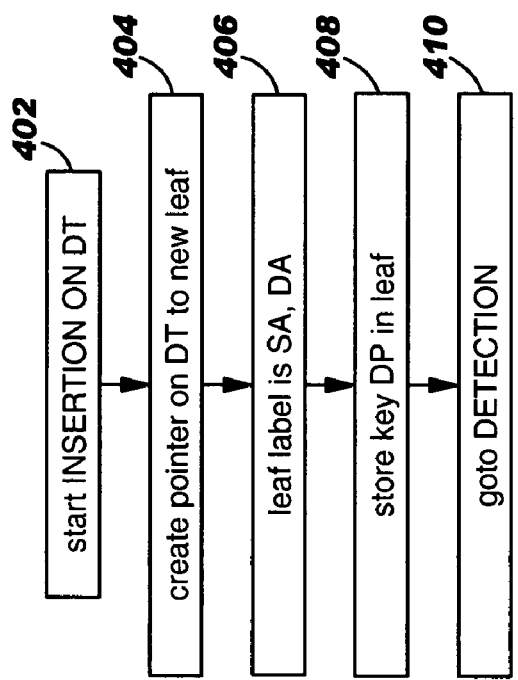
FIG. 4 shows a flowchart for portion of the present invention that pertains to the insertion of a new pointer and new leaf in the Direct Table (DT).
Figure 5:
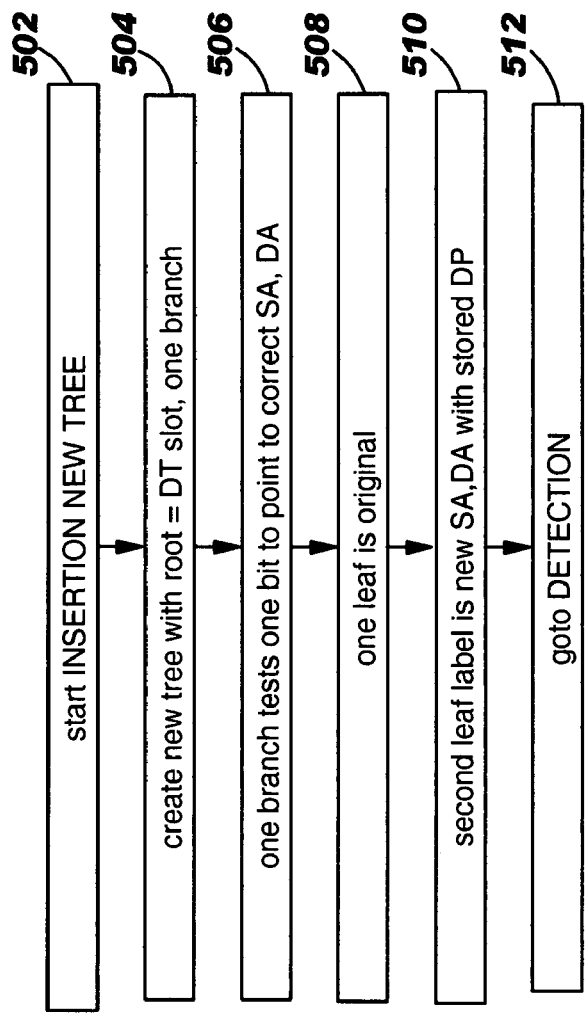
FIG. 5 shows a flowchart for portion of the present invention that pertains to the insertion of a new Patricia tree in the Direct Table (DT).
Figure 6:
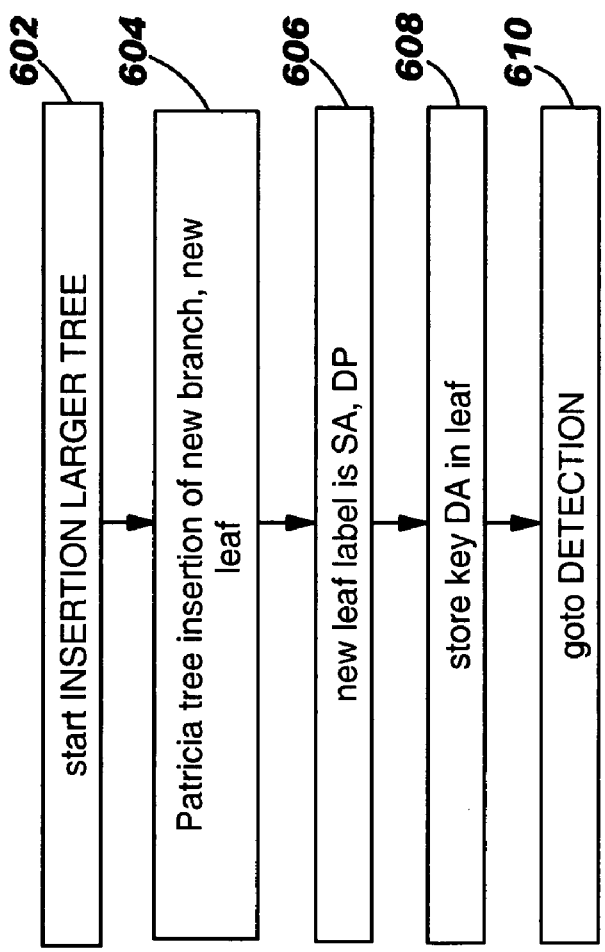
FIG. 6 shows a flowchart for portion of the present invention that pertains to the insertion of a new leaf and new branch within a larger Patricia tree in the Direct Table (DT).
Figure 7:
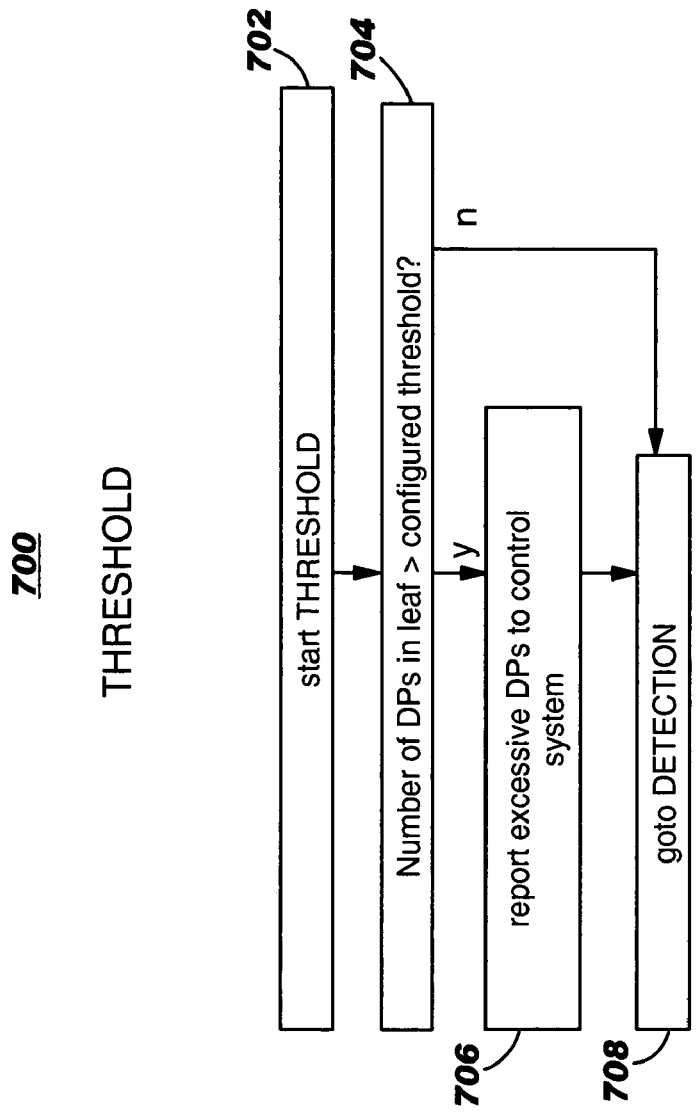
FIG. 7 shows a flowchart for comparing the number of distinct Destination Addresses (DA) in a leaf to a threshold, a portion of the present invention.

Referring to FIG. 3, a flowchart 300 is shown for the DETECTION algorithm included in the present invention. The start Detection 302 of the algorithm is followed by the arrival of the next packet 304. The Internet Protocol (IP) packet is tested 306 for being TCP. The test is carried out on bits in the header of the packet. If it is not, the algorithm returns to 304 to await the next packet. If the packet is TCP, then the packet is tested 308 for being SYN. The test is done by examining control bits in the header of the packet. If it is not, then the algorithm returns to 304. If it is SYN, then the concatenation of SA and DA is fed 312 to a hash function. The value of the hash becomes 314 the index into a Direct Table (DT). The DT slot is tested 316 for already having a pointer to a leaf or to a tree with at least two leaves. If there is no pointer, then the algorithm branches 318 to the INSERTION ON DT algorithm (FIG. 4). If there is a pointer, then the algorithm tests 320 for pointing to exactly one leaf. If the pointer is to a tree with at least two leaves, then the SA, DA concatenation is tested 324 by the Patricia tree algorithm. The SA, DA then tested 330 by the Patricia tree algorithm to try to match the label of an existing leaf. If SA, DA does not match, then the algorithm branches 334 to the INSERTION LARGER TREE algorithm (FIG. 6). If SA, DA does match a leaf in the tree, then the DP of the key is compared 332 to the one or more DP values in the leaf. Going again to 320, if the DT slot points to exactly one leaf, then the algorithm compares 322 the key SA, DA with the label of that leaf. If the SA, DA do not match 326, then the algorithm branches to INSERTION NEW TREE 328 (FIG. 5). If the SA, DA do match 326, then the algorithm branches to a comparison 332 of the DA of the key with the one or more DP values in the leaf. If the key DP matches some leaf DP, then the algorithm returns to 304 to await the next packet. If the key DP does not match any leaf DP, then the new DP is stored 338 in the leaf. The algorithm then goes 340 to the THRESHOLD algorithm (FIG. 7).

In addition to the flowchart, the detection algorithm may also be described as follows:

The 16 bits (or so) of the hash of SA, DA are used as an index in a Direct Table (DT). DT slots are normal FM slots and can point to no leaf, exactly one leaf, or to a tree with branches and two or more leaves. Each leaf compares the full packet SA, DA to an exact pattern of SA, DA. Again, a leaf contains SA, DA as its label and at least one and possibly several DPs.

If upon computation of the hash value for an SA, DA combination it happens that the slot in the DT is empty (points to nothing), then the DT slot is revised to point to a new leaf with label SA, DA and content DP. Else, if the SA, DA slot in the DT has a pointer, then follow it to a leaf or tree. If the slot points to a tree, then this entails testing certain bits in SA, DA until at most one previously seen leaf can possibly fit the SA, DA. In either case, the full SA, DA in the key and the full SA, DA in the leaf are compared. If they are not equal, then the tree must be rebuilt to test for bits in SA, DA to distinguish the new key from previously seen keys. If they are equal, then the leaf truly corresponds to the key and the DP value of the key is compared to the one or several DP values stored in the leaf. If the DP value of the key is the same as a previously stored DP, then do nothing. Else, add the DP value of the key to the one or more DP values stored in the leaf. Also compare the new total number of DP values with a threshold.

An alternate representation of the Detection Algorithm is set forth in Table I. The steps 0 through 16 are self-explanatory. Therefore, further description is not warranted.

TABLE I

DETECTION

0. A next packet arrives.
1. If the packet is not TCP, then goto 0.
2. If the packet is not SYN, then goto DELETION step 1 (TABLE VI).
3. The SA, DA combination (key) from the headers of the packet are fed to a hash function.
4. The hash value is used as an index into a Direct Table slot.
5. If the slot has no pointer (there is no current session with SA, DA that hash to the slot), then goto INSERTION ON DT step 0 (TABLE II).
6. If the slot points to a tree (with two or more leaves), then goto 12.
7. If the slot points to (exactly) one leaf, compare the SA, DA with that of the leaf.
8. If the SA, DA of the key and the leaf do not match, goto INSERTION NEW TREE step 0 (TABLE III).
9. Else, compare sequentially the DP of the packet with the one or more DP values in the leaf.
10. If the DP of the packet and some DP of the leaf are equal, then goto 0.
11. Else, store the new DP in the leaf. Goto THRESHOLD (TABLE V).
12. Perform bit-test branches in the tree on SA, DA of the key until a leaf is reached.
13. If the SA, DA of the key and leaf do not match, goto INSERTION LARGER TREE step 0 (TABLE IV).
14. Else, compare sequentially the DP of the packet with the one or more DP values in the leaf.
15. If the DP of the packet and some DP of the leaf are equal, then goto 0.
16. Else, store the new DP in the leaf. Goto THRESHOLD step 0.

Referring to FIG. 4, a flowchart 400 for the INSERTION algorithm included in the invention is shown. The start 402 of the algorithm is followed by the creation 404 of a new pointer from the Direct Table (DT) slot to a new leaf. The leaf is labeled 406 with the concatenation of SA and DA. The leaf is used to store 408 the value of the DP in the packet IP header. Then the algorithm branches 410 to DETECTION, previously described.

TABLE II is a self-explanatory alternate representation of the Insertion Technique.

TABLE II

INSERTION ON DT

0. Create a pointer from the DT slot to a new leaf which has SA, DA as label and stores DP.
1. Goto DETECTION step 0.

Referring to FIG. 5, a flowchart 500 is shown for the INSERTION NEW TREE algorithm included in the present invention. This algorithm covers the case that one original leaf is already attached to the DT slot and a second leaf with different SA, DA value but the same hash value is to be added. The start 502 of the algorithm is followed by creation of a new tree 504 with root equal to the DT slot. One branch is attached 506 to the root. Two SA, DA value hash to this same slot. In the manner of the well-known Patricia tree algorithm, the first bit is found 508 in which the two SA, DA labels differ. One value of the test bit at the branch points to the original leaf 508. The other possible value of the same bit points to the newly added leaf 510. The newly added leaf has its SA, DA as label and stores the DP of the new key 510. Then the algorithm branches 512 to DETECTION, previously described.

Table III sets forth a self-explanatory alternate representation of Insertion New Tree technique.

TABLE III

INSERTION NEW TREE

0. Create a new tree with root equal the DT slot and one branch.
1. Find first bit in the two concatenations of the two SA, DA combinations in which they differ.
2. Use that bit in a bit-test branch to the two leaves, one leaf is the original and the other is added that has label the new SA, DA and stores the DP of the new key.
3. Goto DETECTION step 0.

Referring to FIG. 6, a flowchart 600 is shown for the INSERTION LARGER TREE algorithm included in the invention. The start 602 of the algorithm is followed by well-known Patricia tree insertion 604 of a new branch and a new leaf. The label of the new leaf is designated 606 as the concatenation of the SA, DA of the key. The DP of the packet is stored 608 in the new leaf. Then the algorithm branches 610 to DETECTION, previously described.

Table IV sets forth a self-explanatory alternate representation of Insertion Larger Tree Algorithm.

TABLE IV

INSERTION LARGER TREE

0. Use conventional Patricia tree algorithm to insert a new bit test branch, add one leaf.
1. The new leaf has the SA, DA of the new key as label and stores the DP.
3. Goto DETECTION step 0.

Referring to FIG. 7, a flowchart 700 is shown for the THRESHOLD algorithm included in the invention. The start 702 of the algorithm is followed by comparing 704 the number of DP values stored in the leaf to a threshold specified at configuration, typically eight. If the number of (distinct) DP values is less than or equal to the threshold, then the algorithm branches 708 to DETECTION. If the number of DP values is greater than the threshold, then a report is sent 706 to the administrator or administration system. Then the algorithm branches 708 to DETECTION.

Table V sets forth a self-explanatory alternate representation of Threshold Algorithm.

TABLE V

THRESHOLD

0. If the new number of DPs in the leaf is above a threshold T, then REPORT the possibility of malicious traffic from the SA.
1. Goto DETECTION step 0.

Figure 8:
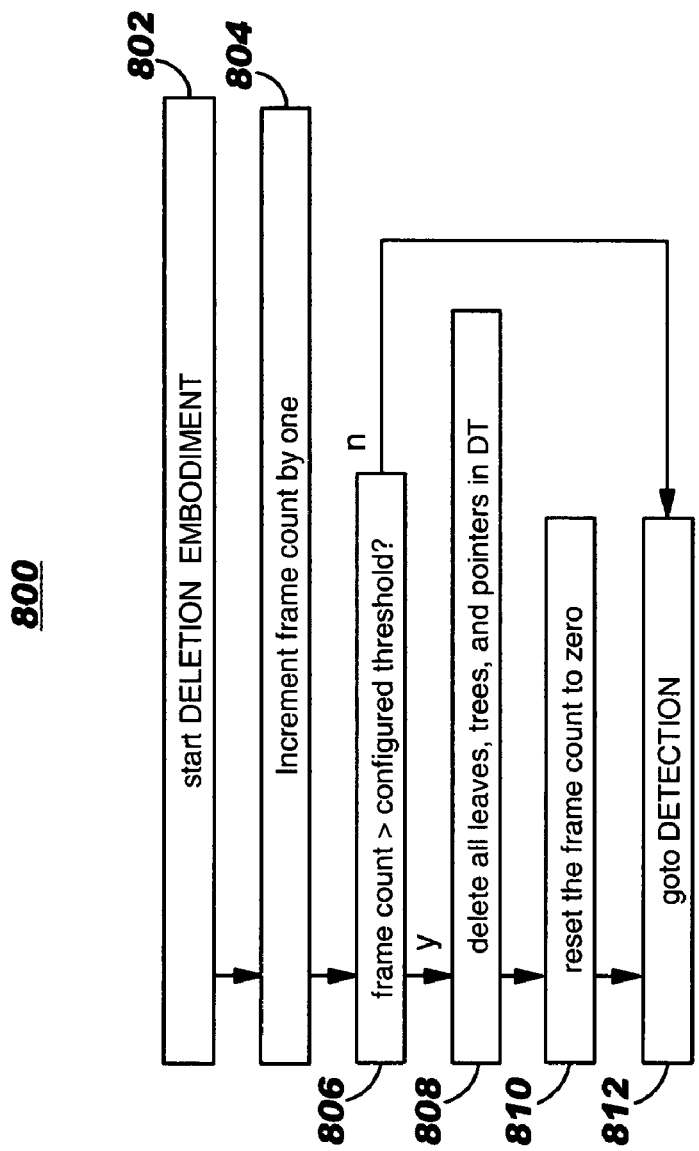
FIG. 8 shows a flowchart for the periodic deletion of all leaves, trees, and pointers to reset the detection apparatus, a portion of the present invention.

Referring to FIG. 8, a flowchart 800 is shown for the DELETION algorithm included in the invention. This algorithm deletes stale entries from the Direct Table/Patricia Tree data structure. The start 802 of the algorithm is followed by incrementing 804 the frame count value by one. Then the frame count is compared 806 to a threshold number of frames such as 1024. If the frame count is not greater than the threshold, then the algorithm branches 812 to DETECTION. If the frame counts is greater than or equal to the threshold, then the algorithm causes the complete deletion 808 of all leaves, trees (branches), and DT pointers. The algorithm next resets 810 the value of frame count to zero. Then the algorithm branches 812 to DETECTION. Table VI sets forth a self-explanatory alternate representation of the Deletion Algorithm.

TABLE VI

DELETION

1. Increment time counter by 1.
2. Compare time counter value to a threshold.
4. If the time count is less than or equal to a threshold, then goto DETECTION step 0.
5. If time counter value exceeds the threshold, then delete all leaves and trees from the DT.
6. Reset the time count to zero.
7. Goto DETECTION step 0.

An alternative embodiment, the count used could be time increments, not number of frames. Those practiced in the art will understand this alternative is a simple change in the DELETION algorithm; Table VII shows a self-explanatory representation of Detection Algorithm based upon time increments.

TABLE VII

DELETION

1. Increment time counter by 1.
2. Compare time counter value to a threshold.
4. If the time count is less than or equal to a threshold, then goto DETECTION step 0.
5. If time counter value exceeds the threshold, then delete all leaves and trees from the DT.
6. Reset the time count to zero.
7. Goto DETECTION step 0.

As stated herein once reconnaissance packets are detected in the network, they are reported to the administrator or other management function for further action.

The invention includes several possible options for a RESPONSE to the reporting mechanism. In one embodiment, the invention can include alerting an administrator who then might investigate the traffic with given SA, DA, DP of the packets causing the branch to the REPORT state for possibly malicious intent. In a second embodiment, the invention could include dropping all subsequent packets with the same SA, DA, DP. In a third embodiment, the invention could include dropping or rate limiting all subsequent packets with the same SA. In a fourth embodiment, the invention could include some combination of the first three possible RESPONSES. The combination of RESPONSES might change with time.

Figure 10:
FIG. 10 represents IP Datagram Header Format.

FIG. 10 shows a graphical representation for the IP datagram header format. Because this IP datagram header format is well known in the prior art only fields of the header that are relevant to the present invention will be identified and discussed. The fields of interest are the Source IP Address (SA) and Destination IP Address (DA). The SA identifies the origin of the datagram (packet) whereas DA identifies the end (destination) of said packet.

Figure 11:
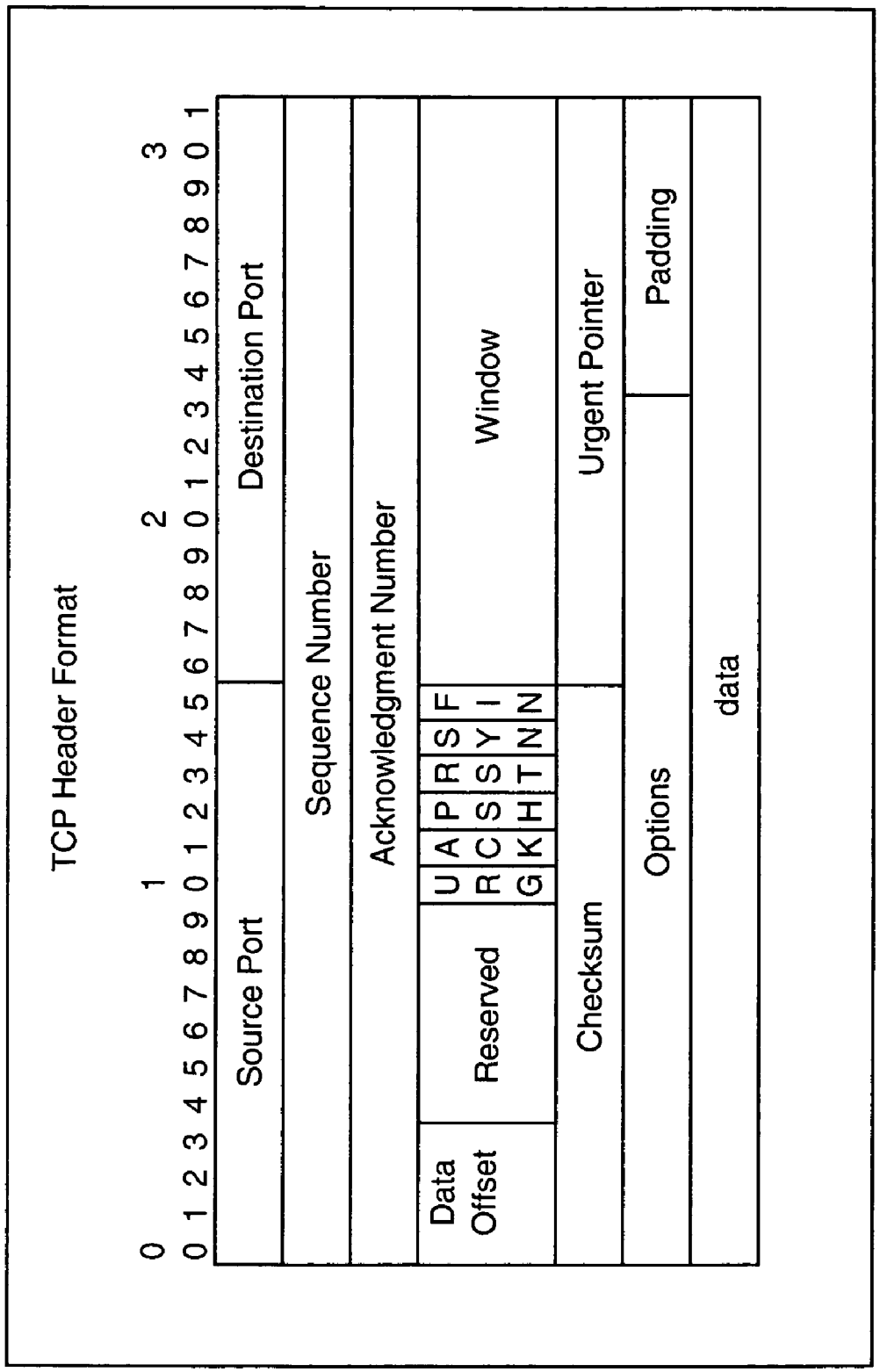
FIG. 11 represents TCP Header Format.

FIG. 11 shows a graphical representation for the TCP Header Format which is nested in the payload field of the IP datagram. The TCP Header Format is also well known in the prior art. Therefore, only the fields and bits which are of interest to the present invention will be discussed further. The fields of interest include Source Port (SP) and Destination Port (DP). As is known to those skilled in the art the SP identifies origination port of a packet, whereas DP identifies end port to which packet is to be delivered. The bits of interest include Reset (RST) and Synchronize (SYN). These bits when set are active and when reset are inactive. The packet identity is determined by setting of the bits. For example, if the SYN bit is set, this would include a SYN packet. The use and function of these bits are well documented in the prior art. Therefore, further discussion is not warranted.

Figure 12:
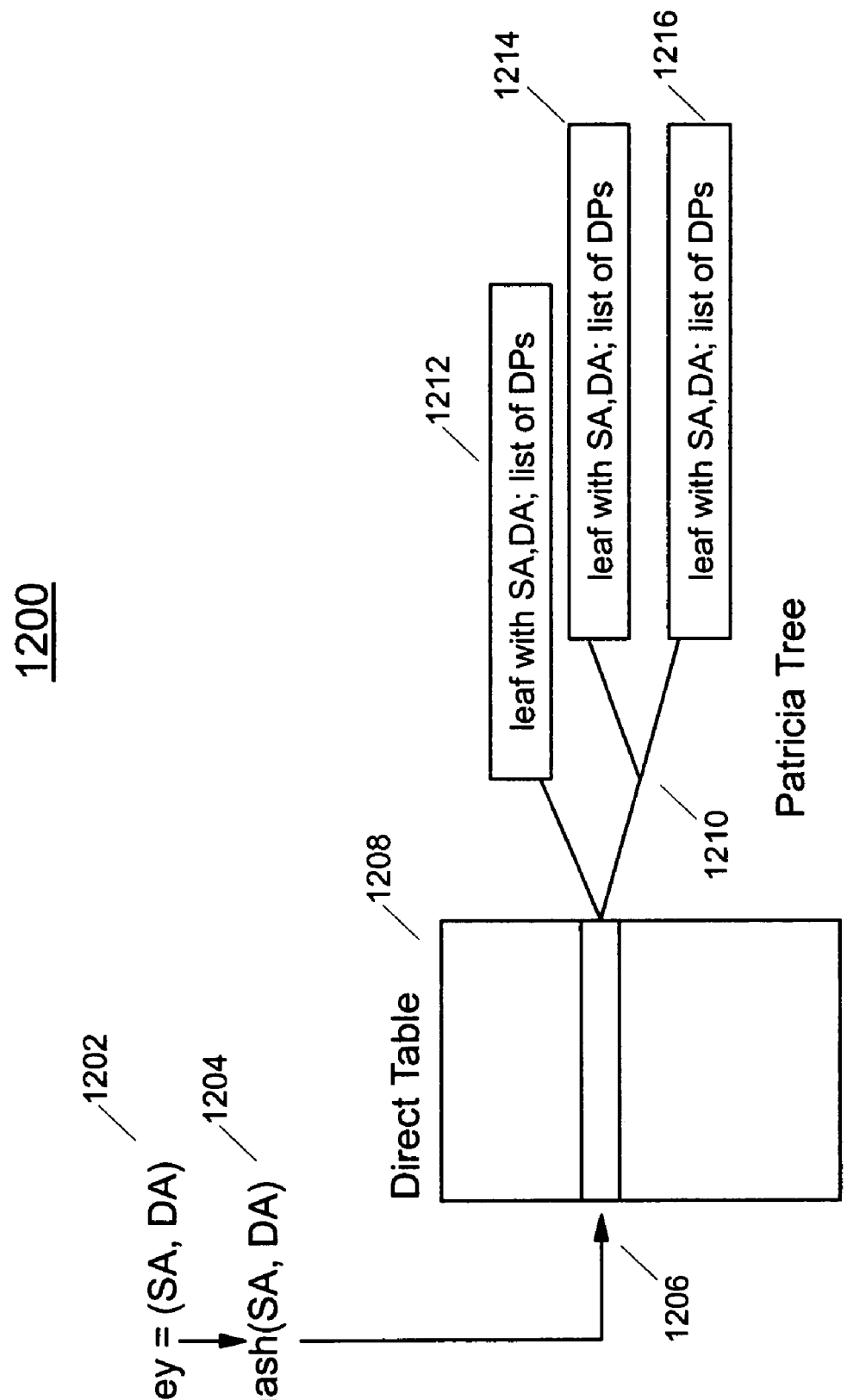
FIG. 12 represents look-up search structure according to teachings of the present invention.

FIG. 12 shows a graphical representation of the search facility or search look-up structure according to the teachings of the present invention. It is recognized that other tree structures can be devised by those skilled in the art. Therefore, the graphical representation is only exemplary and does not limit the scope of the invention claimed.

The data structure 1200 includes the extraction of the key 1202 composed of the concatenation of SA and DA, 64 bits. It further includes applying a hash function 1204 to produce a shorter index such as 16 or 32 bits. The index is used relative to a Direct Table 1208 to identify an entry that is the root of a Patricia tree 1210. The Patricia tree has one or more leaves such as 1212,1214,1216. Each leaf contains the full SA, DA that hashes to the Direct Table entry as well as one or more DP values that have been observed.

Operation:

In operation packets received in a device on which the present invention is deployed are examined as follows:

It is assumed that the lookup mechanism is logically equivalent to a search tree. In one embodiment, the first branch of the tree simultaneously tests many bits, connecting many conventional trees. The first such branch can be called a Direct Table.

The first lookup (first tier) hashes the Source Address (SA) and Destination Address (DA) of a TCP SYN or RST packet to a Direct Table (DT). The index of the DT can be a convenient value (such as 16 bits). The full key is SA, DA, and Destination Port (DP). The leaf matches the packet by SA and DA, then in addition compares DP to a linked list of DPs for the same SA and DA. If the DP is new, then it is added to the list. Periodically (such as once per second) some fraction (such as 1/16) of this lookup is completely deleted.

If the number of observed DPs in a leaf is greater than a threshold (such as 4), then the SA, DA, DP combinations of the leaf are hashed to a second lookup (the second tier). For the second lookup, the hash is on the SA only. The number of bits in the DT index can be low (such as eight). If one SA has many DA, DP combinations, then the DA, DP combinations are stored in a leaf. If the number of DA, DP combinations in such a leaf exceeds a threshold (such as four), then SA is suspected of taking part in a Distributed Scan. The entire table in the second tier is purged within a medium period (such as four seconds).

The suggested purge intervals are based upon reasoning and real traffic statistics. If the purge intervals are too short, then attacks can be overlooked because a full-fledged attack actually spans several periods. If the purge intervals are too long, then the reaction of the invention to a new attack is delayed.

In general, purge intervals can be adjusted. If there are few reported attacks, then the interval can be increased up to a limit. If the are too many reported attacks, then the purge intervals can be decreased to a limit. An exponentially weighted function can be used to increase or decrease periods. The function can be described as follows. Let i denote the index=0, 1, 2, . . . of period P, so P(i) is the ith value in a sequence. P(0)=minimum limit. The period adjustment can have the form 1. If too few reported attacks, then $P(i+1)=(1-K)*P(i)+K*maximum\ limit$.

2. Else $P(i+1)=(1-K)*P(i)+K*minimum\ limit$

Here minimum limit<maximum limit and K is some number with $0<K<=1$.

Even though the present invention has been described in relationship with TCP/IP protocol, this should not be construed as a limitation on the scope of the invention. The present invention has broad application with many different protocols. It is well within the skill of one skilled in the art to apply teachings of the present invention to detect reconnaissance when other protocols are used. Any such usage and/or application are within the scope of the present invention as set forth in the claims.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teaching and advanced use of this invention. Accordingly, all such modifications are intended to be included within the scope of this invention as defined in the claims.

What is claimed is:

1. A method to detect scanning on a network, the method comprising:

implementing a look-up structure in a device coupled to said network, said look-up structure being logically equivalent to a search tree having a first portion partitioned into a plurality of slots with at least one slot operatively coupled to a tree structure;

receiving network traffic in the device from existing traffic on the network;

analyzing the network traffic with a programmed CPU to detect TCP/IP packets having a predefined statistical characteristic;

for each TCP/IP packet so detected, using said programmed CPU to generate a hashed value from a Source Address (SA) and a Destination Address (DA);

using the hashed value to index into a slot;

examining the slot for a pointer;

if no pointer is found, inserting a new leaf with the SA and the DA being an identifier of said leaf;

storing in said leaf an address for a Destination Port (DP) contained in said each TCP/IP packet;

creating a pointer in the slot that points to the leaf;

if a pointer is in the slot, using said pointer to access a leaf;

examining contents of said leaf to detect addresses of Destination Ports (DP) recorded therein;

comparing a number of addresses so detected with a threshold value;

performing a second tier look-up if the number of addresses equals or exceeds the threshold value;

adding the DA to said leaf if the number of addresses in said leaf is less than the threshold value;

issuing an alarm indicating detection of greater than a threshold number of packets with a predefined statistical characteristics that indicates suspicious packets; and limiting all subsequent packets with a same Source Address (SA) as the suspicious packets to a transfer/receipt rate that has a low likelihood of causing injury to the network.

2. A method to detect unauthorized port scanning on a network, the method comprising:

monitoring traffic received in a network device coupled to said network and having a look-up structure that is logically equivalent to a search tree with a first portion partitioned into a plurality of slots with at least one slot operatively coupled to a tree structure;

detecting within said traffic, a predefined subset of packets;

analyzing the predefined subset of packets to detect suspicious packets, which have certain predefined statistical characteristics, wherein said analyzing comprises analyzing the network traffic with a programmed CPU to detect one or more of transmission control protocol/internet protocol (TCP/IP) packets and user datagram protocol (UDP) packets having a predefined statistical characteristic;

issuing an alarm indicating detection of one or more packets that have the predefined statistical characteristics;

in response to detecting the suspicious packets:

identifying a Source Address (SA) and a Destination Address (DA) of the suspicious packets having the predefined statistical characteristics;

for each detected predefined packet having the predefined statistical characteristic, generating, with said programmed CPU, a hashed value from a Source Address (SA) and a Destination Address (DA) of the detected packet;

indexing into a slot of the plurality of slots using the hashed value generated to detect a pointer that is utilized to access a leaf of the tree structure, wherein the leaf corresponds to the pointer; and comparing a number of addresses of Destination Ports (DP) detected within the leaf with a threshold value; and in response to the number of addresses being equal to or greater than the threshold value, an administrative management of the network autonomously rate-limiting all subsequent packets with a same external Source Address (SA) as the suspicious packets to a maximum transfer/receipt rate that has a low likelihood of causing injury to the network.

3. The method of claim 2, wherein indexing into a slot of the plurality of slots using the hashed value generated to detect a pointer further comprises:

examining the slot for a pointer;

in response to no pointer being found, inserting a new leaf in the tree structure utilizing the SA and the DA as an identifier of said new leaf;

storing in said new leaf an address for a Destination Port (DP) contained in said each of the detected predefined packets; and creating a pointer in the slot that points to the new leaf.

4. The method of claim 2, wherein indexing into a slot of the plurality of slots using the hashed value generated to detect a pointer further comprises:

in response to detecting that there is a pointer in the slot, using the pointer to access the leaf;

examining contents of the leaf to detect addresses of the Destination Ports (DP) recorded therein; and adding the DA to said leaf if the number of addresses in said leaf is less than the threshold value; and adding the DP to the leaf if the DP does not exist within the leaf.

5. The method of claim 4, further comprising:

in response to the number of addresses being equal to or exceeding the threshold value, performing a second tier look-up utilizing the SA; and comparing a number of DAs and a number of DPs found by the second tier look-up with a pre-established threshold number and a second pre-established threshold; and initiating the sounding of the alarm in response to the number of DAs and number of DPs being greater than or equal to the second pre-established threshold number.

6. The method of claim 2, wherein the subset of packets include one or more of SYN packets, RST packets, and null TCP packets from a TCP/IP set.

7. The method of claim 6, wherein the subset of packets include at least two of three bits of a TCP header set (SYN, RST, FIN) in TCP packets from a TCP/IP set.

8. The method of claim 2, wherein the detected predefined packets include TCP/IP "Christmas tree" packets.

9. The method of claim 2, wherein issuing an alarm further includes reporting said suspicious packets to a central administrative management and said method further comprises said administrative management dropping all subsequent packets having characteristics like those of the suspicious packets.

10. The method of claim 2, wherein the predefined statistical characteristics include one Source Address (SA), m Destination Address (DA) and n Destination Ports (DP) wherein m is greater than or equal to 1 and n is greater than or equal to 5.

11. The method of claim 2, wherein the predefined statistical characteristics comprise one Source Address (SA), m Destination Address(es) (DA) and n Destination Ports (DP), wherein m is greater than or equal to 1 and n is either greater than or equal to 5 or n is less than 4.

12. The method of claim 2, wherein the predefined statistical characteristics include one Source Address (SA), m Destination Address (DA) with m greater than 1 and n Destination Ports, with n greater than 1.

13. The method of claim 2, wherein one or more of the analyzing, generating, indexing and comparing are performed by a set of one or more algorithms including at least one detection algorithm.

14. The method of claim 2, wherein one or more of the analyzing, generating, indexing and comparing are performed by a set of one or more algorithms including an insertion on Direct Table (DT) algorithm.

15. The method of claim 2, wherein one or more of the analyzing, generating, indexing and comparing are performed by a set of one or more algorithms including an insertion new tree algorithm.

16. The method of claim 2, wherein one or more of the analyzing, generating, indexing and comparing are performed by a set of one or more algorithms including an insertion larger tree algorithm.

17. The method of claim 2, wherein one or more of the analyzing, generating, indexing and comparing are performed by a set of one or more algorithms including a threshold algorithm.

18. The method of claim 2, wherein one or more of the analyzing, generating, indexing and comparing are performed by a set of one or more algorithms including a deletion algorithm.

19. A system to detect scanning on a network comprising:

a memory;

a look-up data structure operatively configured within said memory, wherein the look-up data structure includes a logically equivalent of a search tree, with a first portion partitioned into a plurality of slots with at least one slot operatively coupled to a tree structure; and a processor coupled to the memory and executing a set of algorithms that implement a plurality of functions comprising:

monitoring traffic received in a network device of the system coupled to said network and having the look-up data structure;

detecting within said traffic, a predefined subset of packets;

analyzing the predefined subset of packets to detect suspicious packets, which have certain predefined statistical characteristics, wherein said analyzing comprises analyzing the network traffic with a programmed CPU to detect one or more of transmission control protocol/ internet protocol (TCP/IP) packets and user datagram protocol (UDP) packets having a predefined statistical characteristic;

issuing an alarm indicating detection of one or more packets that have the predefined statistical characteristics;

in response to detecting the suspicious packets:

identifying a Source Address (SA) and a Destination Address (DA) of the suspicious packets having the predefined statistical characteristics;

for each detected predefined packet having the predefined statistical characteristic, generating, with said programmed CPU, a hashed value from a Source Address (SA) and a Destination Address (DA) of the detected packet;

indexing into a slot of the plurality of slots using the hashed value generated to detect a pointer that is utilized to access a leaf of the tree structure, wherein the leaf corresponds to the pointer; and comparing a number of addresses of Destination Ports (DP) detected within the leaf with a threshold value; and in response to the number of addresses being equal to or greater than the threshold value, an administrative management of the network autonomously rate-limiting all subsequent packets with a same external Source Address (SA) as the suspicious packets to a maximum transfer/receipt rate that has a low likelihood of causing injury to the network.

20. The system of claim 19, wherein indexing into a slot of the plurality of slots using the hashed value generated to detect a pointer further comprises:

examining the slot for a pointer;

if no pointer is found, inserting a new leaf in the tree structure utilizing the SA and the DA as an identifier of said new leaf;

storing in said new leaf an address for a Destination Port (DP) contained in said each of the detected predefined packets; and creating a pointer in the slot that points to the new leaf.

21. The system of claim 19, wherein indexing into a slot of the plurality of slots using the hashed value generated to detect a pointer further comprises:

in response to detecting that there is a pointer in the slot, using the pointer to access the leaf;

examining contents of the leaf to detect addresses of the Destination Ports (DP) recorded therein; and adding the DA to said leaf if the number of addresses in said leaf is less than the threshold value; and adding the DP to the leaf if the DP does not exist within the leaf.

22. The system of claim 21, wherein the functions further comprise:

in response to the number of addresses being equal to or exceeding the threshold value, performing a second tier look-up utilizing the SA; and comparing a number of DAs and a number of DPs found by the second tier look-up with a pre-established threshold number and a second pre-established threshold; and initiating the sounding of the alarm in response to the number of DAs and number of DPs being greater than or equal to the second pre-established threshold number.

23. The system of claim 19, wherein the subset of packets include one or more of SYN packets, RST packets, and null TCP packets from a TCP/IP set.

24. The system of claim 19, wherein the subset of packets include at least two of three bits of a TCP header set (SYN, RST, FIN) in TCP packets from a TCP/IP set.

25. The system of claim 19, wherein the detected predefined packets include TCP/IP "Christmas tree" packets.

26. The system of claim 19, wherein issuing an alarm further includes reporting said suspicious packets to a central administrative management and said method further comprises said administrative management dropping all subsequent packets having characteristics like those of the suspicious packets.

27. The system of claim 19, wherein the predefined statistical characteristics include one Source Address (SA), m Destination Address (DA) and n Destination Ports (DP) wherein m is greater than or equal to 1 and n is greater than or equal to 5.

28. The system of claim 19, wherein the predefined statistical characteristics include one Source Address (SA), m Destination Address (DA) with m greater than 1 and n Destination Ports, with n greater than 1.

29. The system of claim 19, wherein one or more of the analyzing, generating, indexing and comparing are performed by a set of one or more algorithms including at least one of a detection algorithm, an insertion on Direct Table (DT) algorithm, an insertion new tree algorithm, an insertion larger tree algorithm, a threshold algorithm, and a deletion algorithm.

30. A computer program product comprising:

a non-transitory computer readable memory medium; and program code on the computer readable memory medium that when executed by a processor within a network-connected device performs functions of one or more algorithms, the functions including:

monitoring traffic received in a network device coupled to said network and having a look-up structure that is logically equivalent to a search tree with a first portion partitioned into a plurality of slots with at least one slot operatively coupled to a tree structure;

detecting within said traffic, a predefined subset of packets;

analyzing the predefined subset of packets to detect suspicious packets, which have certain predefined statistical characteristics, wherein said analyzing comprises analyzing the network traffic with a programmed CPU to detect one or more of transmission control protocol/internet protocol (TCP/IP) packets and user datagram protocol (UDP) packets having a predefined statistical characteristic;

issuing an alarm indicating detection of one or more packets that have the predefined statistical characteristics;

in response to detecting the suspicious packets:

identifying a Source Address (SA) and a Destination Address (DA) of the suspicious packets having the predefined statistical characteristics;

for each detected predefined packet having the predefined statistical characteristic, generating, with said programmed CPU, a hashed value from a Source Address (SA) and a Destination Address (DA) of the detected packet;

indexing into a slot of the plurality of slots using the hashed value generated to detect a pointer that is utilized to access a leaf of the tree structure, wherein the leaf corresponds to the pointer; and comparing a number of addresses of Destination Ports (DP) detected within the leaf with a threshold value; and in response to the number of addresses being equal to or greater than the threshold value, an administrative management of the network autonomously rate-limiting all subsequent packets with a same external Source Address (SA) as the suspicious packets to a maximum transfer/receipt rate that has a low likelihood of causing injury to the network.

31. The computer program product of claim 30, wherein the indexing into a slot of the plurality of slots using the hashed value generated to detect a pointer further comprises:
examining the slot for a pointer;
in response to no pointer being found, inserting a new leaf in the tree structure utilizing the SA and the DA as an identifier of said new leaf;
storing in said new leaf an address for a Destination Port (DP) contained in said each of the detected predefined packets; and
creating a pointer in the slot that points to the new leaf.

32. The computer program product of claim 30, wherein indexing into a slot of the plurality of slots using the hashed value generated to detect a pointer further comprises:
in response to detecting that there is a pointer in the slot, using the pointer to access the leaf;
examining contents of the leaf to detect addresses of the Destination Ports (DP) recorded therein; and
adding the DA to said leaf if the number of addresses in said leaf is less than the threshold value; and
adding the DP to the leaf if the DP does not exist within the leaf.

33. The computer program product of claim 30, wherein the functions further comprises:
in response to the number of addresses being equal to or exceeding the threshold value, performing a second tier look-up utilizing the SA; and
comparing a number of DAs and a number of DPs found by the second tier look-up with a pre-established threshold number and a second pre-established threshold; and
initiating the sounding of the alarm in response to the number of DAs and number of DPs being greater than or equal to the second pre-established threshold number.

34. The computer program product of claim 30, wherein the predefined statistical characteristics include one Source Address (SA), m Destination Address (DA) and n Destination Ports (DP) wherein m is greater than or equal to 1 and n is greater than or equal to 5.

* * * * *